(12) United States Patent
Gretz

(10) Patent No.: US 6,355,887 B1
(45) Date of Patent: Mar. 12, 2002

(54) CABLE SUPPORT

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 09/780,865

(22) Filed: Feb. 9, 2001

(51) Int. Cl.⁷ .................................................. H02G 3/10
(52) U.S. Cl. ........................ 174/72 A; 174/135; D8/396; 24/16 PB; 24/30.5 P; 248/73; 248/74.3
(58) Field of Search .................. 174/72 A, 135; D8/356, 396; 24/16 PB, 17 A, 17 AP, 30.5 P, 269; 248/62, 73, 74, 74.3

(56) References Cited

U.S. PATENT DOCUMENTS

| | | | | |
|---|---|---|---|---|
| 4,191,334 A | * | 3/1980 | Bulanda et al. ........... | 24/16 PB |
| 4,766,651 A | * | 8/1988 | Kobayashi et al. ....... | 24/16 PB |
| D305,099 S | * | 12/1989 | Naruse et al. ............... | D8/396 |
| D305,977 S | * | 2/1990 | Ono .............................. | D8/396 |
| 5,675,870 A | * | 10/1997 | Cooper ...................... | 24/16 PB |
| D389,051 S | * | 1/1998 | Caveney et al. ............. | D8/396 |
| 5,926,921 A | * | 7/1999 | Benoit ....................... | 24/16 PB |
| D419,861 S | * | 2/2000 | Khokhar ...................... | D8/396 |

* cited by examiner

*Primary Examiner*—Anthony Dinkins
*Assistant Examiner*—Adolfo Nino

(57) ABSTRACT

An integral or unitary cable support comprising a generally V-shaped base for mounting on an appropriate structural member, a flexible strap integrally formed with the base and extending from one side of said generally V-shaped base, the flexible strap having a base end attached to the base and an outer surface that includes a series of transverse teeth that engage a similarly shaped and angled tooth located in a slot in a flange extending from the opposite side of said generally V-shaped base such that the teeth on the flexible strap engage the tooth in the slot when the distal end of the flexible strap is inserted into the slot to form an enclosed area between the flexible strap and the generally V-shaped base.

5 Claims, 2 Drawing Sheets

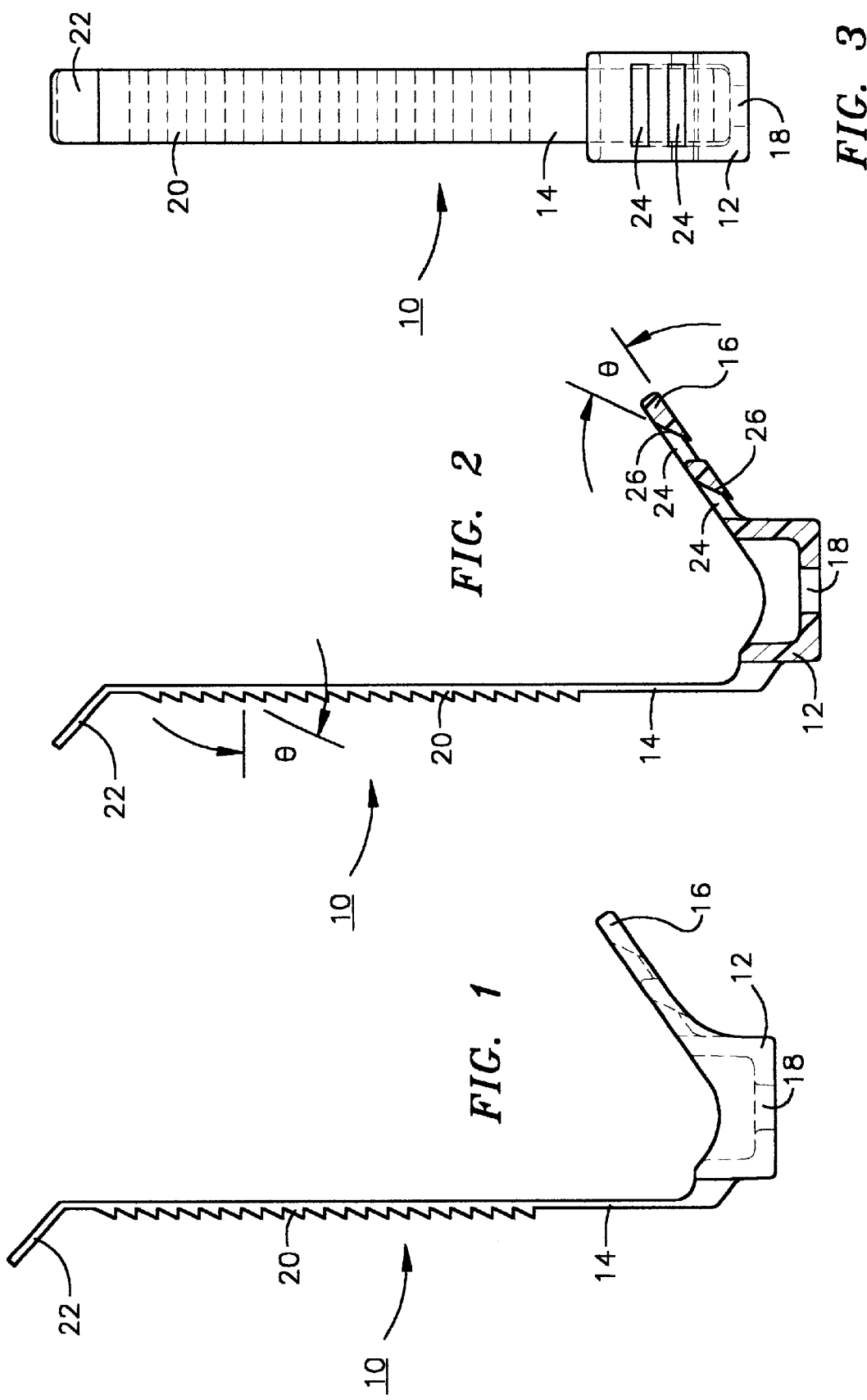

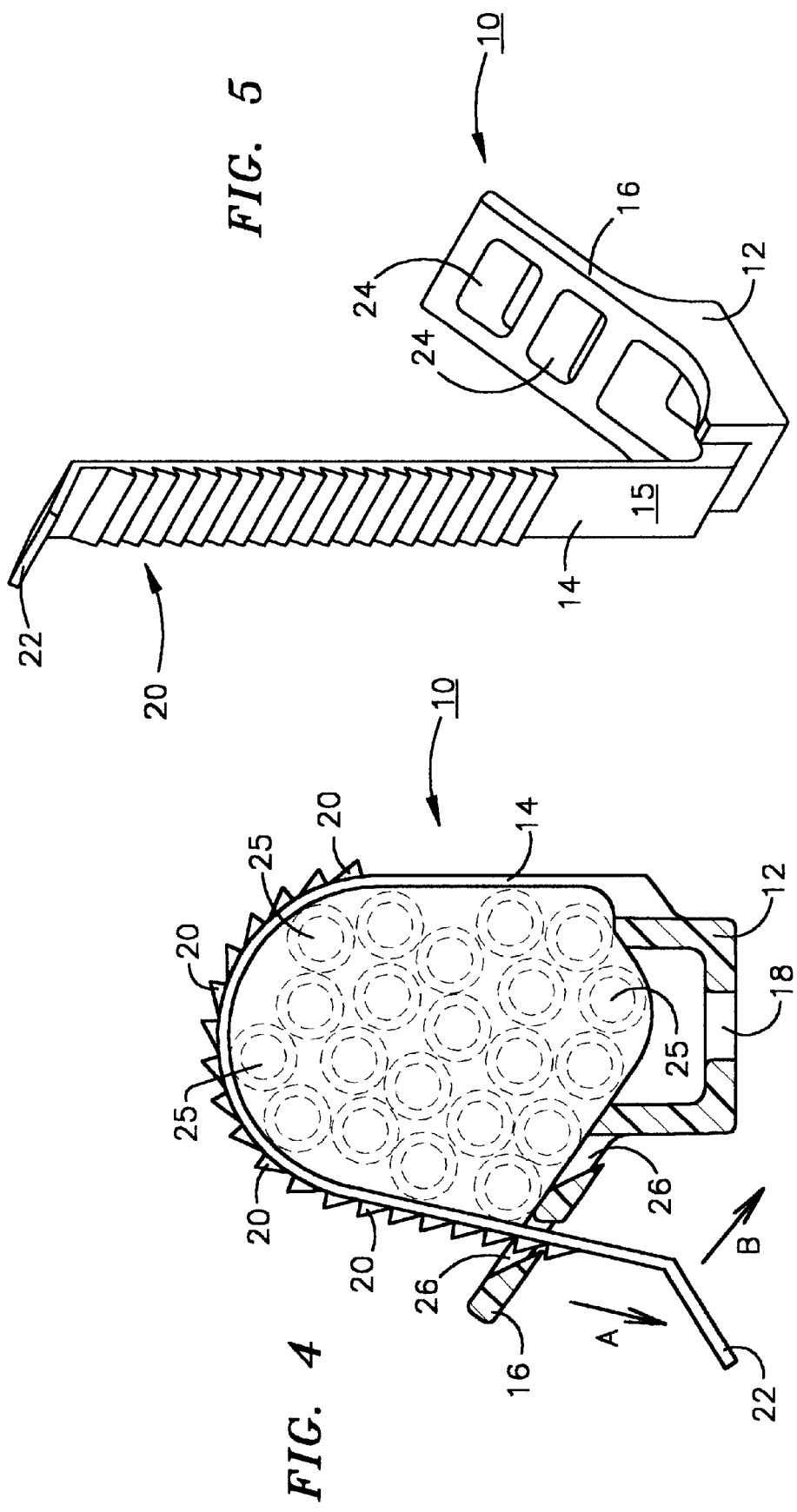

CABLE SUPPORT

FIELD OF THE INVENTION

The present invention relates to a cable support useful for the easy, safe and secure installation of such electrical and electronic cables, including fiber optic cable.

BACKGROUND OF THE INVENTION

With the advent and growth of computer and communications applications in the business environment, the retrofit installation of delicate and sophisticated cabling such as twisted pair and fiber optic cables as well as retrofit electrical power cables has become more and more of an issue. Unlike conventional electrical wiring, delicate communications cable cannot be abused either in its installation or use. Bending excessively, kinking, sharp bending, contact with sharp edges, etc. all can cause harm to the cable which affects its intended performance. This problem is not quite so significant in new construction where cable trays designed to receive such cabling are installed during construction to accommodate current and future needs. In retrofit applications, however, means must be provided for the easy, safe and secure installation and maintenance of such cabling. Additionally, the problem of locating and mounting even more conventional power cables in retrofit installations continues to grow as more and more electronic devices are installed.

Accordingly, a number of hangers or supports for such cabling have been designed and marketed primarily for the retrofit market. For example, U.S. Pat. No. 5,740,994 describes a cable support which is generally J-shaped and has a saddle portion which is curved around the base of the J and flat across the base of the J. Downward extending flanges on either side of the flat base of the J are provided to ease the transition of a sagging cable suspended between two such supports as the cable is laid from one side of the support, across the flat portion of the support and off of the other side thereof. While this structure is useful, the presence of the flat base can still result in excessive bending of the cabling and the curved portion of the saddle all but forces the individual cables into contact with one another. Such a condition is generally considered undesirable because of the potential for interference between abutting cables. Additionally, use of the cable support described in this patent requires the use of a separate cable tie across the open face of the J to secure the cable after installation.

A variety of flexible such supports have also been suggested for such use. One such device is manufactured and sold by Caddy Fasteners of Solon, Ohio. This device utilizes a flexible strap having one end thereof attached to a mounting base and the opposing or free end thereof including a rigid cross member whose exposed ends engage tabs on the mounting base when the flexible strap is folded upon itself to encompass inserted wiring. In order to secure the strap tightly to the mounting base, crimping of the mounting base incorporated tabs is necessary. While such crimping provides a secure closure of the support, removal of a wire or the insertion of another wire or wires is made more complicated by the need to "uncrimp" the tabs to permit removal of the flexible strap.

Yet another such device is described in U.S. Pat. No. 3,542,321 issued Nov. 24, 1970 that calls for a cable tie including a flexible serrately toothed strap terminating in a strap-receiving loop fitted with a strap retaining flexible pawl carrying a release member for insertion into or unitary with an adherent mounting plate. The device described in this patent requires separate deflection of a pawl for engagement and disengagement of the loop retention mechanism.

OBJECTS OF THE INVENTION

It is an object of the present invention to provide an improved flexible cable support structure that provides an integral cable support with rapid and easy securing of the flexible strap to its mounting without the need for crimping or other additional installation steps.

It is a further object of the present invention to provide a flexible cable support that provides a secure mounting for cables or wiring that can be readily disassembled for removal of one or more wires or the insertion of additional wires without the need to "uncrimp" or otherwise perform additional operations that require the use of a second hand to unfasten or open the cable support.

SUMMARY OF THE INVENTION

According to the present invention, there is provided an integral or unitary flexible cable support comprising a generally V-shaped base for mounting on an appropriate structural member, a flexible strap integrally formed with the base and extending from one side of said generally V-shaped base, the flexible strap having a base end attached to the base, a distal end and an outer surface that includes a series of transverse teeth that engage a similarly shaped and angled tooth located in a slot in a flange extending from the opposite side of said generally V-shaped base such that one of the teeth on the flexible strap engage a tooth in the slot when the distal end of the flexible strap is inserted into the slot to form an enclosed area between the flexible strap and the generally V-shaped base.

DESCRIPTION OF THE DRAWINGS

FIG. 1 is a partially phantom left side view of the cable support of the present invention in its open configuration.

FIG. 2 is cross sectional right side view of the cable support of the present invention in its open configuration.

FIG. 3 is a partially phantom front view of the cable support of the present invention in its open configuration.

FIG. 4 is cross sectional view of the cable support of the present invention in its closed configuration and including enclosed cables.

FIG. 5 is a perspective view of the cable support of the present invention in it open configuration.

DETAILED DESCRIPTION

Referring now specifically to FIG. 5, but as can be seen in each of the other views presented in FIGS. 1–4, Cable support 10 of the present invention comprises a generally V-shaped base 12 having an integrally formed flexible strap 14 extending from one leg of generally V-shaped base 12 and an integrally formed slotted flange 16 extending from the opposite leg of generally V-shaped base 12. As best seen in FIGS. 1–4, base 12 includes an aperture 18 for attaching base 12 and consequently cable support 10 to a surface or structural member. Flexible strap 14 includes along its outer surface 15 a series of transverse teeth 20 and preferably includes a distal end tab 22 that extends angularly away from outer surface 15. The purpose of tab 22 will be explained hereinafter.

Flange 16 includes at least one and preferably two or more slots 24 of a size to accommodate receipt of flexible strap 14 when flexible strap 14 is bent upon itself and inserted into one of slots 24 as best shown in FIG. 4 that also shows cables 25 enclosed within flexible strap 14 in this closed position. Each of slots 24 includes a transverse tooth 26 that in the closed position of FIG. 4 is the mirror image of teeth 20 on flexible strap 14 such that one of teeth 20 can engage a tooth 26 when strap 14 is inserted through one of slots 24 and the resilience of flexible strap 14 forces teeth 20 in the direction of one of teeth 26, i.e. away from base 12. Clearly, the presence of a series of teeth 20 allows for adjustment in the length of flexible strap 14 to accommodate different numbers of cable 25 therein.

While it is quite possible to provide a useful cable support in accordance with the present invention with a wide variety of "tooth angles", i.e. the angle between the terminus of teeth 20 or 26 and the surface of flexible strap 14 or the surface of flange 16 respectively depicted as θ in FIG. 2, it is preferred that these angles range from about 50 to about 70 degrees so as to provide optimal gripping and engagement when teeth 20 and 26 mate as shown in FIG. 4. According to a highly preferred embodiment of the present invention, these angles are about 60 degrees.

Previously described tab 22 at the distal end or terminus of flexible strap 14 serves as a means to grab flexible strap 14 and pull it away from flange 16 in the direction shown by arrow A in FIG. 4 for purposes of disengaging teeth 20 and 26 and then moving flexible strap 14 toward base 12 in the direction depicted by arrow B so that flexible strap 14 can be retracted through aperture 24 for removal of cable support 10 from about cables 25 for purposes of insertion or removal of one or more cables from the confines of cable support 10. Tab 22, because of its angular orientation relative to base 12 and engaging teeth 20 and 26 also allows the user to more easily push flexible strap 14 in direction B after disengagement of teeth 20 and 26.

Although cable support 10 can be fabricated from a number of materials including a variety of polymers such as polyethylene, polypropylene, etc, it is preferred that cable support 10 be fabricated from a nylon material as such materials generally provide the appropriate degree of flexibility and resilience to allow ready bending of flexible strap 14 accompanied by the appropriate degree of resilience to assure proper engagement of teeth 20 and 26 upon closure of cable support 10 as shown in FIG. 4 accompanied by relatively simple and easy disengagement of teeth 20 and 26 and removal of cable support 10 when desired.

Similarly, flexible strap 14 can be fabricated in a large number of thicknesses. Generally, the larger overall cable support 10 is, i.e. the more cables 25 that can be supported therein, the greater the thickness of flexible strap 14 will be. However, flexible strap thicknesses of between about $1/32^{nd}$ to about $1/8^{th}$ of an inch have been found to provide optimum performance.

As the invention has been described, it will be apparent to those skilled in the art that the same may be varied in many ways without departing from the spirit and scope of the invention. Any and all such modifications are intended to be included within the scope of the appended claims.

What is claimed is:

1. A cable support comprising:

A) a base having a generally V-shaped front surface defined by a pair of oppositely extending legs and a rear surface;

B) a flexible strap integrally formed with and extending from the first of said oppositely extending legs having:
  1. a base end proximate said base;
  2. a distal end;
  3. a front surface addressing said base;
  4. a rear surface; and
  5. a series of flexible strap teeth transverse said flexible strap on said rear surface intermediate said base end and said distal end; and C) a flange integrally formed with and extending from the second of said pair of legs and including;
  1. at least one transverse slot of a size to receive said flexible strap and including as one transverse side of said transverse slot a tooth of similar configuration as said flexible strap teeth, said tooth engaging one of said flexible strap teeth when said flexible strap is inserted through said at least one transverse slot and pulled to permit such engagement.

2. The cable support of claim 1 further including:

A) an aperture in said base rear surface for attachment of said cable support to a surface; and B) a tab on said distal end extending away from said base.

3. The cable support of claim 2 wherein said cable support is fabricated from nylon and said flexible strap ranges in thickness from about 1/32 to about 1/8 of an inch.

4. The cable support of claim 3 wherein said flexible strap teeth and said transverse slot tooth extend at an angle of from about 50 to about 70 degrees from the surface from which they extend.

5. The cable support of claim 4 wherein said teeth extend at an angle of about 60 degrees.

* * * * *